April 17, 1928.  1,666,122

J. W. DENNISTON

CIRCUIT CLOSER

Filed May 19, 1926

J. W. Denniston
Inventor,
By C. A. Snow & Co.
Attorneys.

Patented Apr. 17, 1928.

1,666,122

UNITED STATES PATENT OFFICE.

JONATHAN W. DENNISTON, OF BEDFORD, INDIANA.

CIRCUIT CLOSER.

Application filed May 19, 1926. Serial No. 110,245.

This invention relates to a circuit closer, designed primarily for use upon motor vehicles, one of the objects being to provide a novel structure whereby when the same is moved out of a normal position, by the tilting of the vehicle or in any other manner, it will act to close the circuit controlled thereby.

A further object is to provide a means whereby the device can be adjusted for actuation by a very slight movement of the vehicle or by more extensive movement, as preferred.

With the foregoing and other objects in view which will appear as the description proceeds, the invention resides in the combination and arrangement of parts and in the details of construction hereinafter described and claimed, it being understood that changes in the precise embodiment of the invention disclosed may be made within the scope of what is claimed without departing from the spirit of the invention.

In the accompanying drawings the preferred form of the invention has been shown.

In said drawings.

Figure 1:
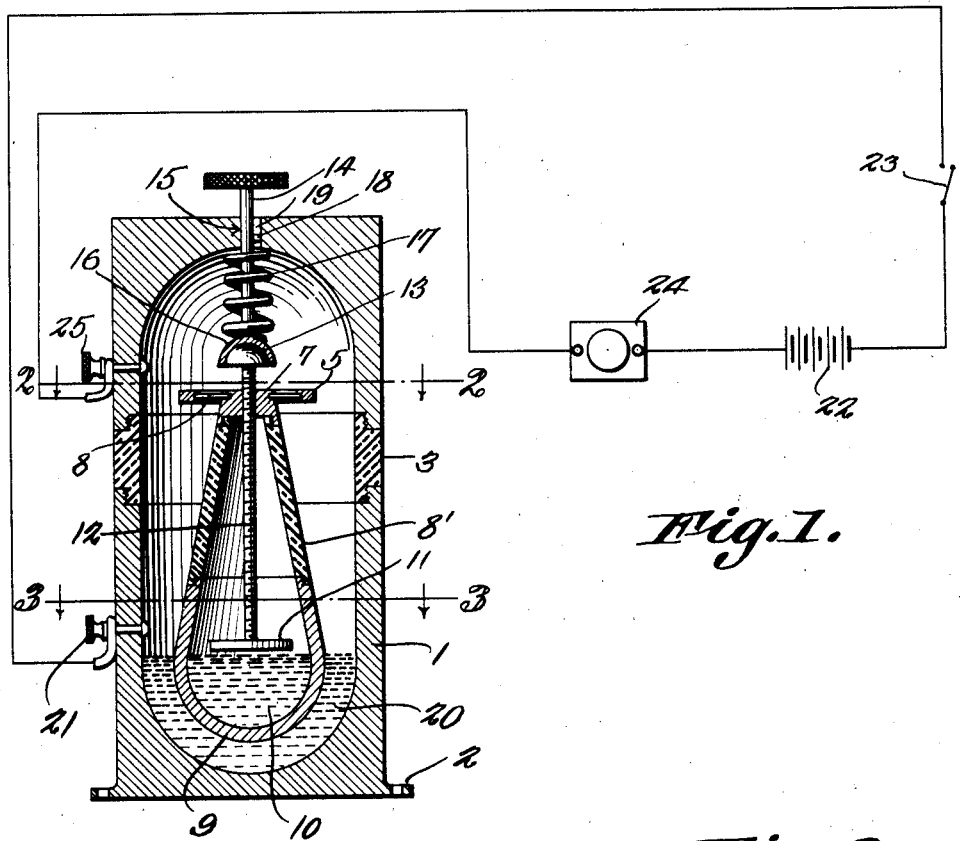
Figure 1 is a section through the circuit closer, the same being shown assembled with an automobile alarm, the alarm apparatus being illustrated in diagram.
Figures 2, 3:
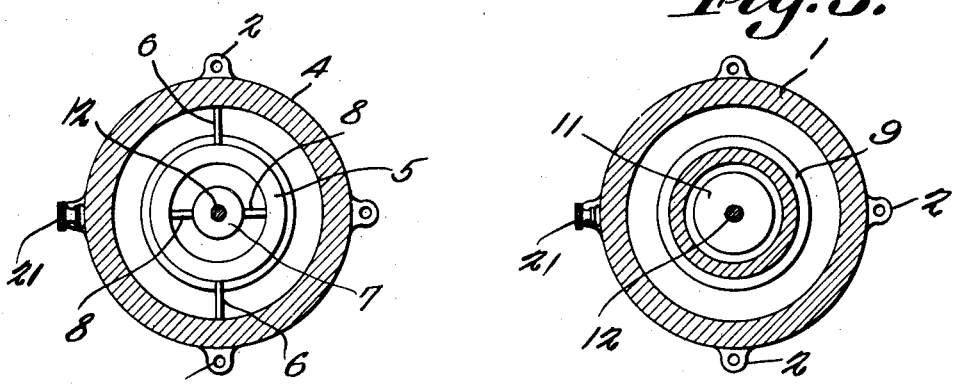
Figure 2 is a section on line 2—2 Figure 1.
Figure 3 is a section on line 3—3 Figure 1.

Referring to the figures by characters of reference 1 designates the lower section of the casing of the circuit closer, this section being formed of a material which will not be affected by mercury but which constitutes a good conductor of electricity. This section is adapted to be fastened on a supporting structure by any suitable means, as by fasteners extending through apertured ears 2. Detachably connected to the upper end of the section 1 is a coupling ring 3 formed of insulating material and which also engages the top member 4 of the casing. This top member is likewise formed of a material which will not be affected by mercury but which constitutes a good conductor of electricity.

A ring 5 is supported within the central portion of the upper member 4 by means of two oppositely extending pins 6 of conducting material and mounted within this ring is a cap 7 connected to the ring by means of oppositely extending pins 8. The pins 8 are disposed at right angles to the pins 6 and it will be apparent, therefore, that these pins and the ring provide a universal connection between the cap 7 and the member 4.

Connected to the bottom of the cap 7 is a frusto-conical tubular member 8' formed of an insulating material which will not be affected by mercury and to the bottom of this member 8 is connected a cup 9 formed of a material which is not affected by mercury but which constitutes a good conductor of electricity. The cup 9, insulating member 8' and cap 7 cooperate to form a pendulum and within the cup 9 is provided some mercury indicated at 10 and which constitutes a part of the circuit closing medium.

A contact disk 11 is supported within the cup 9 normally out of contact with the mercury 10, this disk having a threaded stem 12 extending upwardly therefrom through and engaging the cap 7, there being a rounded head 13 at the upper end of the stem as shown. A holding means is provided in the upper portion of the casing for preventing movement of the pendulum. This means includes a stem 14 slidable and rotatable within an opening 15 in the top of member 4. At the lower end of the stem 14 there is provided a foot 16 having a recess designed to receive the head 13. A coiled spring 17 is mounted on the stem 14 and bears at one end against the foot 16 and at its other end against the top portion of the member 4. A lug 18 is extended radially from stem 14 and is slidable within a groove 19. It will be apparent that by pulling the stem 14 upwardly the lug or stud 18 can be withdrawn from the groove 19 and by then giving the stem a partial rotation this lug or stud 18 will be brought to position away from the groove 19 and rest upon the top surface of the section 4 so as to support the foot 16 out of contact with the head 13 and to hold the spring 17 under compression. This is the position of the parts when set for actuation.

A body of mercury indicated at 20 is provided within the lower member 1 so as to surround the lower portion of the pendulum. A binding post 21 is connected to the member 1 and is electrically connected to one terminal of a battery 22 or other source of electrical energy, it being understood that a switch 23 can be located where desired for the purpose of opening and closing the circuit. Any suitable electrically operated device, such as an alarm 24 which can be in the form of a bell, a light or the like, is electrically connected to the other terminal of battery 22 and to a binding post 25 connected to the member 4. When the switch 23 is closed it will be apparent that a tilting of the casing 1 in any direction will result in agitation of the mercury 10 which will be caused to come against the disk 11. This will complete the circuit because the cup 9 is constantly electrically connected to the member 1 by the mercury and the current will therefore flow from the disk 11 through the stem 12 to the pins 8, ring 9 and pins 6 and thence to the member 4. By adjusting the disk 11 toward or from the surface of the mercury the apparatus can be made more or less delicate in action. When it is desired to hold the pendulum against movement the pin 14 is rotated so that the lug or stud 18 can move downwardly within the groove 19 under the action of the spring 17. The foot 16 will engage and bear upon the head 13 and hold the pendulum against movement.

While the pendulum is set for operation the swinging movement thereof is more or less retarded by the mercury 20 so that excessive vibration while the vehicle is in motion is avoided.

It will be apparent that after this apparatus has once been installed in a car and set for operation, any starting, stopping or tilting of the vehicle will result in closing the circuit and operating the alarm.

What is claimed is:

1. A device of the class described including a casing having upper and lower portions of conducting material but insulated from each other, said portion being included in a circuit, a hollow pendulum suspended within the casing from the upper member for swinging movement in any direction, said pendulum being electrically connected to the upper member of the casing, the lower portion of the pendulum constituting a container of conducting material insulated from the upper portion which is connected to the casing, a contact suspended within the pendulum from the upper portion thereof, a mercury conductor interposed between the lower portion of the pendulum and the lower member of the casing, and a mercury conductor within the lower portion of the pendulum and normally close to but out of contact with the contact within the pendulum.

2. A device of the class described including a casing having upper and lower portions insulated from each other but formed of conducting material, said portions being included in a circuit, a pendulum having upper and lower portions of conducting material and an intermediate connecting portion of insulating material, said pendulum having a universal connection with and electrically connected to the upper member of the casing, a contact electrically connected to the upper portion of the pendulum and supported within the lower portion of the pendulum, a conducting fluid within the lower portion of the pendulum with its level normally close to the contact, and a conducting liquid within the lower portion of the casing and surrounding the lower portion of the pendulum.

3. A device of the class described including a casing, a pendulum mounted for universal swinging movement therein, said pendulum including upper and lower conducting portions insulated from each other, the lower portion constituting a container, a conducting liquid interposed between the lower porton of the pendulum and the lower portion of the casing, a liquid conductor within the lower portion of the pendulum, and a contact within the pendulum movable with the pendulum, said contact being adjustable relative to the surface of the conducting liquid within the pendulum.

In testimony that I claim the foregoing as my own, I have hereto affixed my signature.

JONATHAN W. DENNISTON.